(12) United States Patent
Lu et al.

(10) Patent No.: US 11,402,593 B2
(45) Date of Patent: Aug. 2, 2022

(54) OPTICAL COMMUNICATION SYSTEM

(71) Applicant: Prime World International Holdings Ltd., New Taipei (TW)

(72) Inventors: Hsiang-Jen Lu, New Taipei (TW); Ming-You Lai, New Taipei (TW); Che-Shou Yeh, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/931,996

(22) Filed: Jul. 17, 2020

(65) Prior Publication Data

US 2022/0019040 A1    Jan. 20, 2022

(51) Int. Cl.
*G02B 6/42* (2006.01)

(52) U.S. Cl.
CPC .......... *G02B 6/4292* (2013.01); *G02B 6/421* (2013.01); *G02B 6/428* (2013.01); *G02B 6/4261* (2013.01); *G02B 6/4269* (2013.01); *G02B 6/4277* (2013.01)

(58) Field of Classification Search
CPC ...... G02B 6/42; G02B 6/4292; G02B 6/4261; G02B 6/428; G02B 6/421; G02B 6/4269
See application file for complete search history.

(56) References Cited

U.S. PATENT DOCUMENTS

| | | | |
|---|---|---|---|
| 10,578,818 B1* | 3/2020 | Chen | G02B 6/4261 |
| 10,698,168 B1* | 6/2020 | Lin | H01S 5/023 |
| 2017/0023751 A1* | 1/2017 | Steijer | G02B 6/4259 |
| 2019/0018206 A1* | 1/2019 | Luo | G02B 6/425 |
| 2019/0113698 A1* | 4/2019 | Huang | G02B 6/4246 |
| 2022/0019040 A1* | 1/2022 | Lu | G02B 6/428 |

\* cited by examiner

*Primary Examiner* — Tina M Wong
(74) *Attorney, Agent, or Firm* — Grossman Tucker Perreault & Pfleger, PLLC

(57) ABSTRACT

An optical communication system includes a light source module, a circuit board, a light emitter and a ROSA. The circuit board is disposed in the light source module. The light emitter is disposed in the light source module and electrically connected to the circuit board. The ROSA is located outside the light source module, and the ROSA is optically coupled to the light emitter.

9 Claims, 5 Drawing Sheets

OPTICAL COMMUNICATION SYSTEM

BACKGROUND

Technical Field

The present disclosure relates to optical communication, more particularly to an optical communication system including transmitter optical subassembly (TOSA) and receiver optical subassembly (ROSA).

Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

As to the optical components in a conventional optical transceiver, a circuit board is disposed in a housing, and a TOSA as well as a ROSA are mounted on the circuit board. In some cases, the optical transceiver further includes a heat conductive structure on the housing for dissipating heat generated by the optical components.

SUMMARY

According to one aspect of the present disclosure, an optical communication system includes a light source module, a circuit board, a light emitter and a ROSA. The circuit board is disposed in the light source module. The light emitter is disposed in the light source module and electrically connected to the circuit board. The ROSA is located outside the light source module, and the ROSA is optically coupled to the light emitter.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
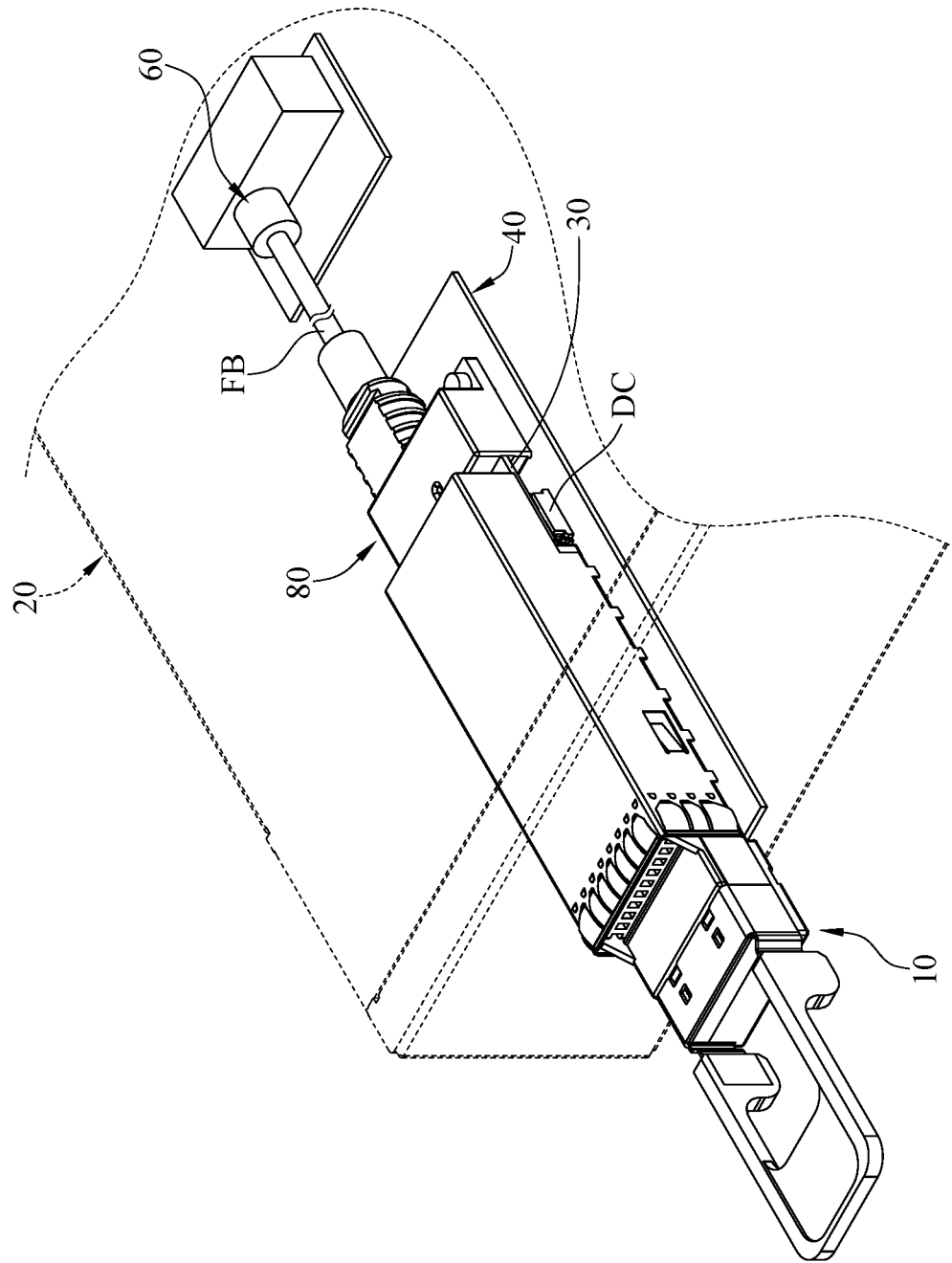
FIG. 1 is a perspective view of an optical communication system according to one embodiment of the present disclosure.
Figure 2:
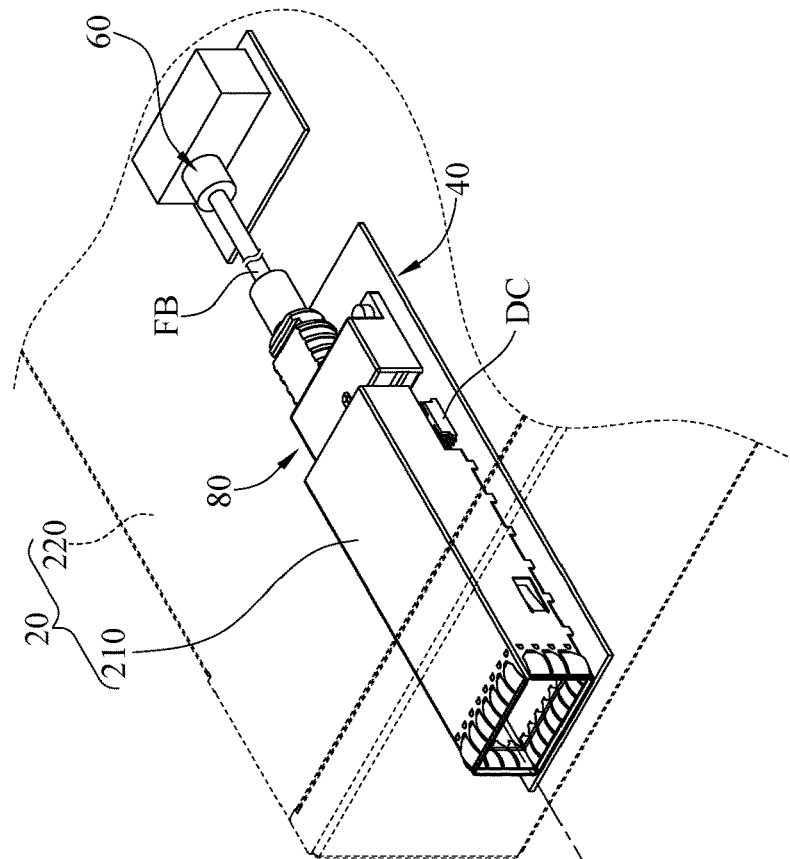
FIG. 2 is an exploded view of the optical communication system in FIG. 1.
Figure 2:
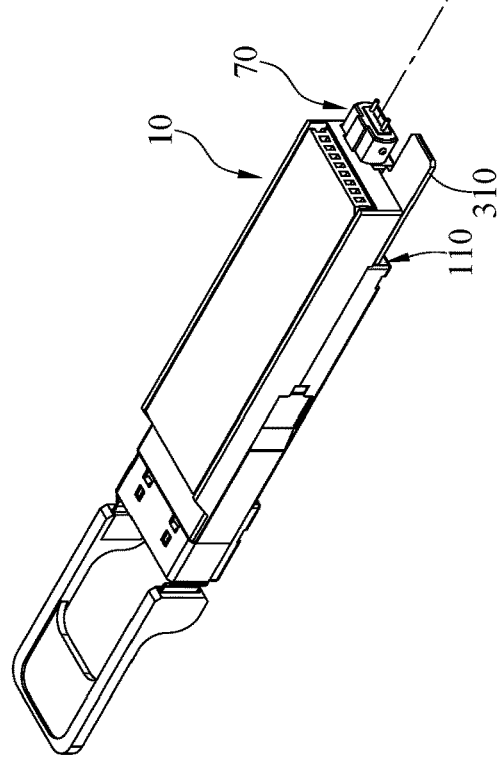
Figure 3:
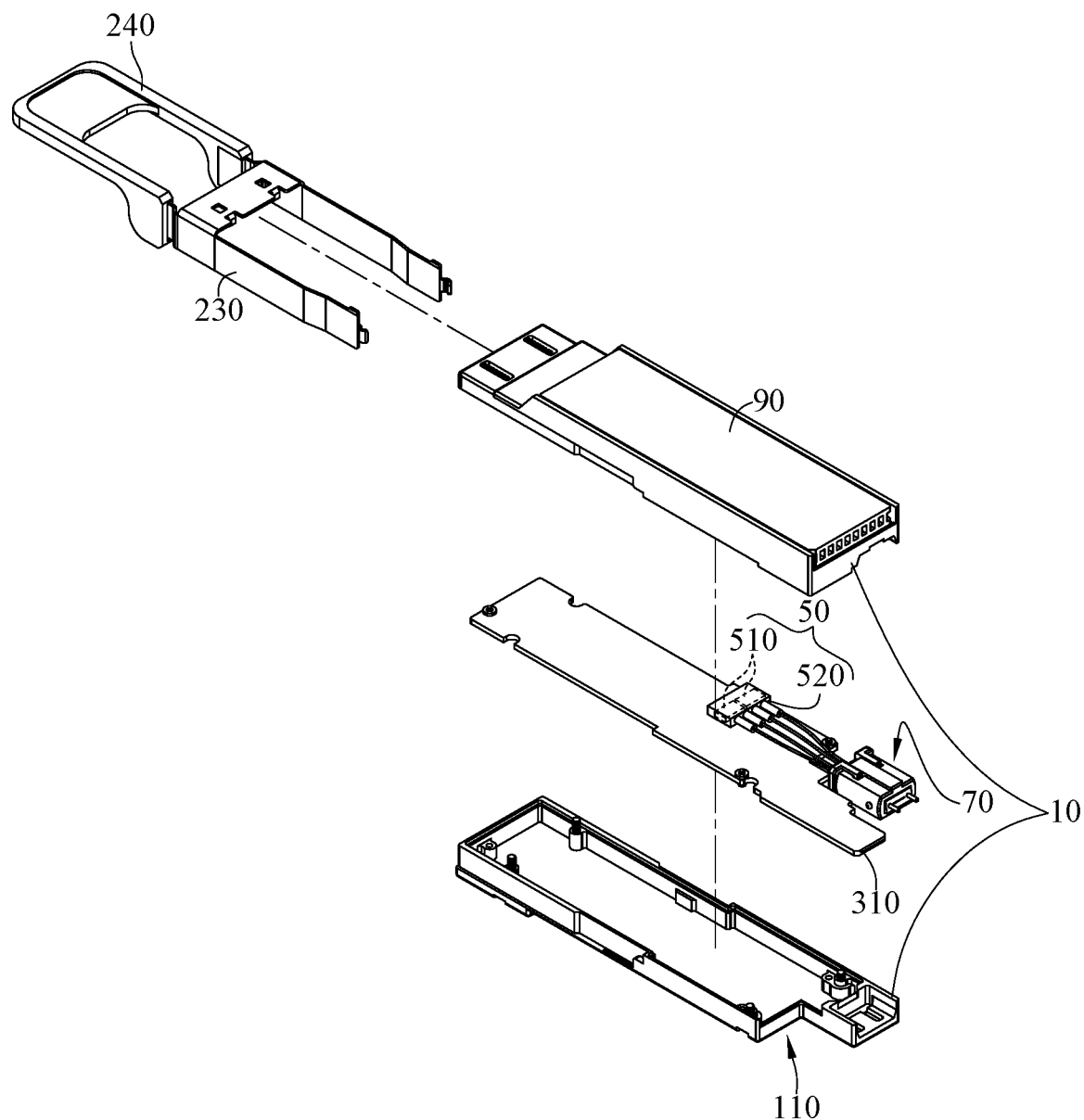
FIG. 3 is another exploded view of the optical communication system in FIG. 1.

Please refer to FIGS. 1 to 3. An optical communication system 1 is provided with FIG. 1 a perspective view of such optical communication system according to one embodiment of the present disclosure. FIG. 2 is an exploded view of the optical communication system in FIG. 1. In this embodiment, the disclosed optical communication system 1 includes a light source module 10, a receiver housing 20, a transmitter circuit board 30, a receiver circuit board 40, a light emitter set 50 and a ROSA 60. The receiver housing 20 might be the housing of an Ethernet switch or a part of the same. The ROSA 60 might be implemented in terms on-board optics (OBO) module disposed within the Ethernet switch on basis of COBO technology. The receiver housing 20 might include a TOSA sharing the OBO module. The TOSA in the present disclosure is different from its conventional counterpart. More specifically, the TOSA in the present disclosure does not include the light emitter set 50. The receiver circuit board 40 might be where some components of the light emitter set 50 are placed. A fiber (FB) might be used to couple the ROSA 60 and the light emitter set 50 through an opening 110 of the light source module 10. The light emitter set 50 might be connected to another device through another fiber (not shown) through another opening opposite from the opening 110. The fiber (FB) might also couple the ROSA 60 and the light emitter set 50 through an optical adaptor 80. More details about the optical adaptor 80 would be presented later. The light emitter set 50 is configured to consistently emit lights, with the modulation thereof performed by the TOSA or another component within the receiver housing 20 such as a modulation integrated circuit (IC). TOSA might have other components such as a sub-mount, a monitoring photodiode (PD), and an isolator. The TOSA components excluding the light emitter set 50 might be placed within the receiver housing 20.

The receiver housing 20 includes a cage 210 and a casing 220. The cage 210 is disposed in the casing 220. The cage 210 might be a connection port of the Ethernet switch allowing for the light source module 10 to be plugged into in a detachable fashion.

FIG. 3 is an exploded view of the light source module 10 according to one embodiment of the present disclosure. The light source module 10 might house a transmitter circuit board 30 (FIG. 1). The transmitter circuit board 30 has an electrical interface 310 exposed to outside through the opening 110. The electrical interface 310, for example, is gold fingers or metal pads (not shown in the drawings). The light source module 10 is connected to the receiver housing 20 in pluggable manner. Specifically, the light source module 10 is detachably inserted into the cage 210 of the receiver housing 20. The receiver circuit board 40 is located outside the light source module 10 and disposed in the casing 220 of the receiver housing 20. The electrical surface 310 might be connected to a connector (DC) disposed on the transmitter circuit board 30, and the connector (DC) might be connected to a power supply (not shown).

In this embodiment, a fastening component, such as an elastic clip 230 in FIG. 3, may be movably disposed on side surfaces of the light source module 10 so that the light source module 10 could be detachably fasten-able with the slot/port on the cage 210. Furthermore, a bail 240 may be pivotally connected to the fastening component of the light source module 10, allowing for the light source module 10 to be removed from the cage 210 with the pull of the bail 240.

The light emitter set 50 might include at least one light emitter 510 and a fiber array 520 disposed in the light source module 10. The light emitter 510 and the fiber array 520 optically coupled to each other. The light emitter 510, for example, is a laser diode (LD) disposed on the transmitter circuit board 30 and electrically connected to the electrical interface 310 of the transmitter circuit board 30. The electrical interface 310 is configured to contact the connector (DC). It is worth noting that the present disclosure is not limited to the number of light emitters 510 shown in the drawings. Also, the light emitter set 50 may include additional optical components such as optical lenses or optical fibers in the light source module 10.

The ROSA 60 is located outside the light source module 10 and disposed in the casing 220 of the receiver housing 20. In other words, the optical communication system 1 in this embodiment is provided without a ROSA located in the light source module 10. The ROSA 60 is optically coupled to the light emitter set 50 via the fiber (FB). The ROSA 60 includes a photodiode (PD) configured to receive optical signals from the light emitter set 50 and then convert the optical signals into electrical signals. It is worth noting that the present disclosure is not limited to the number of ROSAs 60 shown in the drawings. In short, the disclosed optical communication system 1 might have the light emitter 510 and the ROSA 60 disposed in different housings. In a case that some components of the light emitter set 50 are in the casing 220, these components and the ROSAs 60 can be mounted on the same circuit board.

As shown in FIG. 2 and FIG. 3, a fiber connector 70 is disposed on the transmitter circuit board 30, and the fiber connector 70 is optically coupled to the fiber array 520 of the light emitter set 50 and the fiber FB. With the fiber connector 70, the light emitter set 50 and the ROSA 60 could be optically coupled.

In this embodiment, both the fiber connector 70 and the electrical interface 310 are located on an end of the transmitter circuit board 30. As shown in FIG. 2 and FIG. 3, the electrical interface 310 and the fiber connector 70 are located on the same end of the transmitter circuit board 30 which is relatively close to the fiber FB. The electrical interface 310 and the fiber connector 70 are two independent components in FIG. 2 and FIG. 3, but the present disclosure is not limited thereto. In some embodiments, the electrical interface and the fiber connector can be integrated to from one-piece component. Moreover, since the electrical interface 310 and the fiber connector 70 are located on the same side, it is not necessary to use an external fiber (a fiber located outside the light source module 10 and the receiver housing 20) to couple the light emitter set 50 with the ROSA 60. The present disclosure also helps eliminate electromagnetic interference with the components nearby the light source module 10.

Figure 4:
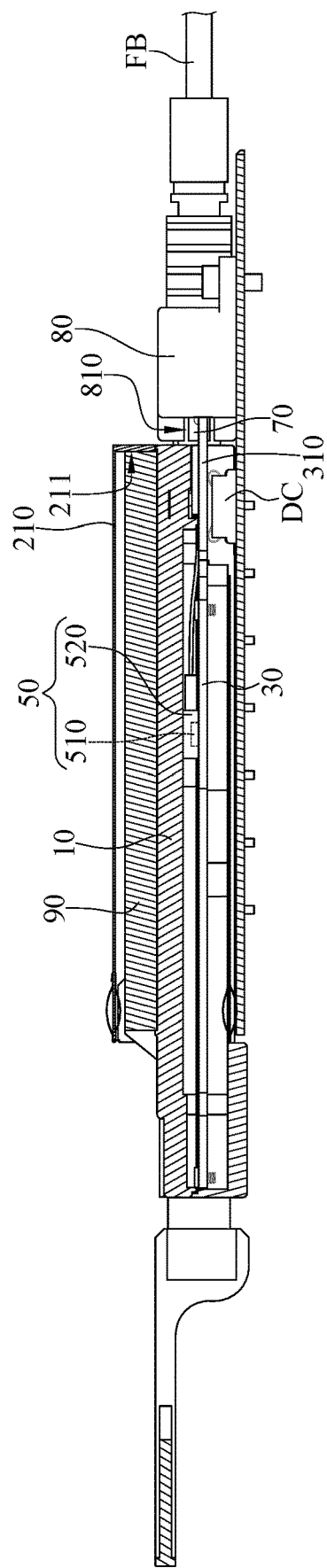
FIG. 4 is a cross-sectional view of the optical communication system in FIG. 1.

The optical communication system may include an optical adaptor. FIG. 4 is a cross-sectional view of a part of the optical communication system in FIG. 1. More specifically, FIG. 4 shows a cross-sectional view of the light source module 10 when it is placed within the slot/port of the cage.

The optical adaptor 80 is provided in the cage 210 of the receiver housing 20, and the ROSA 60 is optically coupled to the light emitter set 50 via the optical adaptor 80. Specifically, the optical adaptor 80 has a guide slot 810, and both the fiber connector 70 and the fiber FB are slidably inserted into the guide slot 810.

As shown in FIG. 4, a heat sink 90 is disposed on the outer surface of the light source module 10, and the cage 210 has a blocking surface 211. When the light source module 10 is inserted into the cage 210, the heat sink 90 presses against the blocking surface 211 to indicate a proper position of the light source module 10 in the cage 210.

Figure 5:
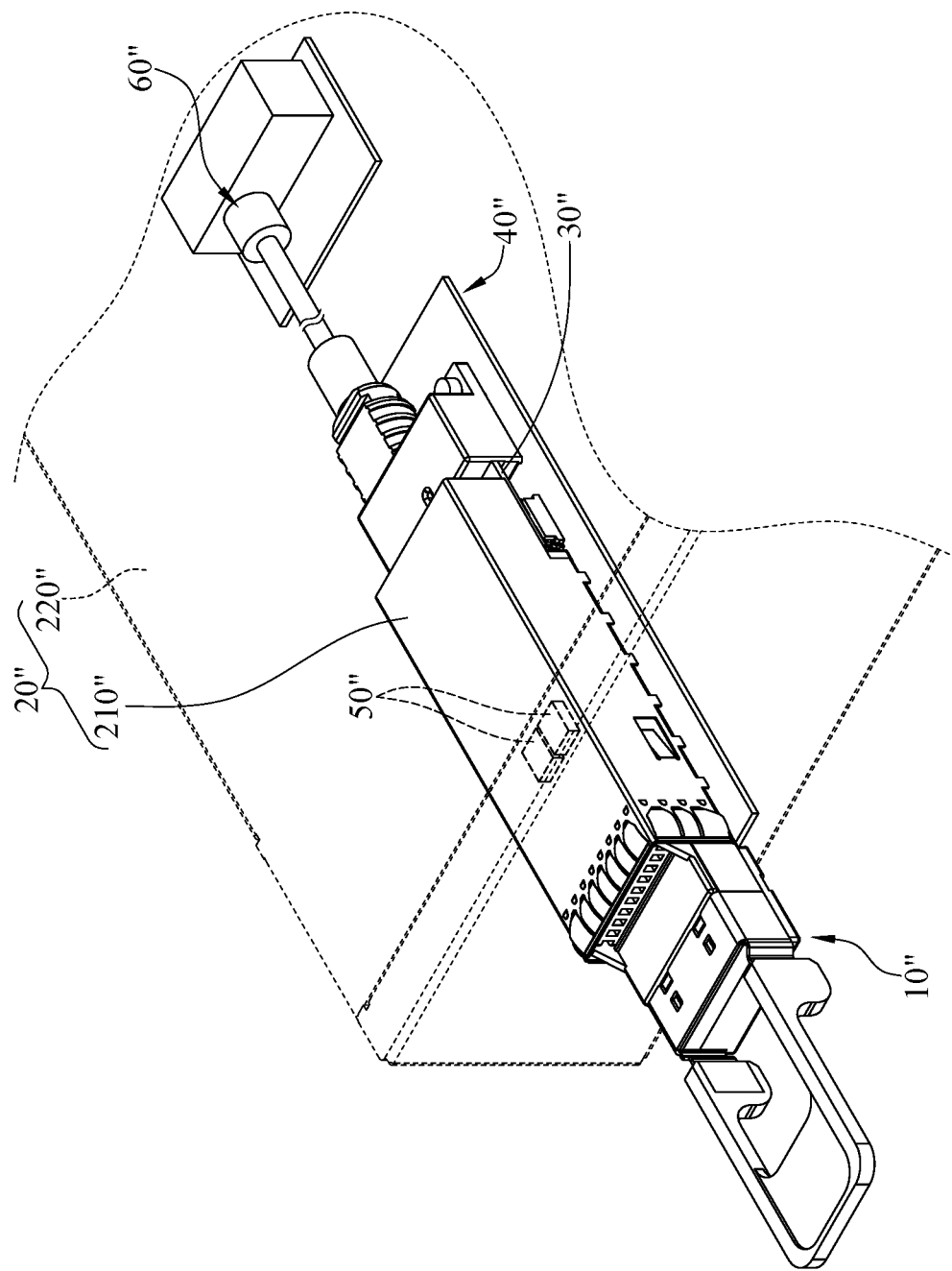
FIG. 5 is a perspective view of an optical communication system according to another embodiment of the present disclosure.

FIG. 5 is a perspective view of another optical communication system according to another embodiment of the present disclosure. In this embodiment, an optical communication system 2 includes a light source module 10", a receiver housing 20", a transmitter circuit board 30", a receiver circuit board 40", a light emitter set 50" and a ROSA 60".

The receiver housing 20" includes a cage 210" and a casing 220". The cage 210" is disposed in the casing. The transmitter circuit board 30" is disposed in the light source module 10", and the light source module 10" is connected to the receiver housing 20" in pluggable manner. The receiver circuit board 40" is located outside the light source module 10" and disposed in the casing 220" of the receiver housing 20". The light emitter set 50" is disposed in the light source module 10" and electrically connected to the transmitter circuit board 30". The ROSA 60" is located outside the light source module 10" and disposed in the casing 220" of the receiver housing 20".

In this embodiment, the light emitter set 50" includes multiple light emitters 510", and these light emitters 510" are provided with each of them working independently. Specifically, the light emitters 510", for example, are laser diodes arranged inside the light source module 10", and the light emitters 510" can generate lights at the same or different wavelengths and light intensity. One of the light emitters 510" is used as default, and the other light emitters 510" are prepared for the backup purpose. Generally, the backup light emitters 510" might not be operational when the default one functions. Once the default light emitter 510" is not functional, another backup light emitter 510" could be enabled or activated to take over.

Moreover, once some components of the light emitter set 50", including the light emitter, in the light source module is not functional, such component(s) can be replaced with a new one to ensure the proper operation of the optical communication system. Since the light emitter is usually a fragile optical component in the optical communication system with the relatively shorter service life, the present disclosure is favorable for a convenient replacement of the light emitters. Replacement of the light emitters or switch to the backup light emitters could be realized without having the receiver housing opened up. The light source module could be replaced to ensure the proper operation of the optical communication without having the receiver housing opened up as well.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:
1. An optical communication system, comprising:
a light source module;
a circuit board disposed in the light source module;
a light emitter disposed in the light source module and
   electrically connected to the circuit board; and a receiver optical subassembly (ROSA) located outside the light source module, and the ROSA optically coupled to the light emitter;

a fiber connector disposed on the circuit board for optically coupling the light emitter and the ROSA;

a receiver housing located outside the light source module, wherein the ROSA and a transmitter optical sub-assembly (TOSA) excluding the light emitter are disposed in the receiver housing.

2. The optical communication system according to claim 1, further comprising a fiber array optically coupled to the light emitter, wherein the fiber array is optically coupled to the fiber connector.

3. The optical communication system according to claim 1, wherein the circuit board has an electrical interface, the light emitter is electrically connected to the electrical interface, and both the fiber connector and the electrical interface are located on an end of the circuit board.

4. The optical communication system according to claim 1, further comprising an optical adaptor, wherein the ROSA is optically coupled to the light emitter via the optical adaptor.

5. The optical communication system according to claim 4, wherein the optical adaptor has a guide slot, and the fiber connector is slidably inserted into the guide slot.

6. The optical communication system according to claim 1, wherein the receiver housing includes a cage and a casing, the cage is disposed in the casing, and the light source module is detachably inserted into the cage.

7. The optical communication system according to claim 6, further comprising a heat sink disposed on an outer surface of the light source module, wherein the cage has a blocking surface, and the heat sink presses against the blocking surface.

8. The optical communication system according to claim 1, wherein the light emitter is a laser diode electrically connected to the circuit board and optically coupled to the ROSA.

9. The optical communication system according to claim 1, further comprising a transmitter optical sub-assembly (TOSA) within the light source module.

* * * * *